United States Patent
Fujii et al.

(10) Patent No.: US 8,834,267 B2
(45) Date of Patent: Sep. 16, 2014

(54) AVATAR USEABLE IN MULTIPLE GAMES THAT CHANGES APPEARANCE ACCORDING TO THE GAME BEING PLAYED

(75) Inventors: Takahiro Fujii, Saitama (JP); Haruko Yamazaki, Kanagawa (JP); Eri Maruyama, Tokyo (JP); Hiroshi Harada, Tokyo (JP); Toshiaki Tarumi, Tokyo (JP); Ryosuke Tamura, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 671 days.

(21) Appl. No.: 12/695,393

(22) Filed: Jan. 28, 2010

(65) Prior Publication Data

US 2010/0197396 A1 Aug. 5, 2010

(30) Foreign Application Priority Data

Feb. 5, 2009 (JP) .................. 2009-025290

(51) Int. Cl.
*A63F 9/24* (2006.01)
*A63F 13/00* (2014.01)
*A63F 13/40* (2014.01)

(52) U.S. Cl.
CPC ............ *A63F 13/10* (2013.01); *A63F 2300/65* (2013.01); *A63F 2300/5553* (2013.01); *A63F 2300/575* (2013.01)
USPC ............................................. 463/31; 463/30

(58) Field of Classification Search
CPC .............. A63F 13/10; A63F 2300/575; A63F 2300/807; A63F 2300/8082
USPC .................................. 463/1, 30, 31
See application file for complete search history.

(56) References Cited

U.S. PATENT DOCUMENTS

| 6,009,458 | A | * | 12/1999 | Hawkins et al. ............... 709/203 |
| 6,428,414 | B1 | | 8/2002 | Shimomura et al. |
| 7,780,530 | B2 | * | 8/2010 | Ushiro et al. .................... 463/42 |
| 8,066,571 | B2 | * | 11/2011 | Koster et al. .................... 463/42 |
| 2002/0049087 | A1 | * | 4/2002 | Ushiro et al. ................... 463/42 |
| 2002/0142836 | A1 | | 10/2002 | Nakazato |

(Continued)

FOREIGN PATENT DOCUMENTS

| JP | 2000-135374 | 5/2000 |
| JP | 2003-173451 | 6/2003 |

(Continued)

OTHER PUBLICATIONS

Japan Office Action in JP 2009-025290, dated Feb. 15, 2011.

(Continued)

*Primary Examiner* — Lawrence Galka
(74) *Attorney, Agent, or Firm* — Greenblum & Bernstein, P.L.C.

(57) ABSTRACT

An object of the present invention is to provide a game apparatus that can display an avatar matched to any kind of game in which the avatar participates, without changing clothes or decorations worn by the avatar to new clothes or decorations. The game apparatus specifies display data of items based on attributes set to the items and includes a design table where a correspondence relationship between the attributes and the display data of the items is set. Display data of the player character is generated based on the specified display data of the items, and the player character is displayed on a display screen based on the generated display data of the player character.

16 Claims, 7 Drawing Sheets

(56) References Cited

U.S. PATENT DOCUMENTS

| | | | |
|---|---|---|---|
| 2004/0043805 A1 | 3/2004 | Sonoda | |
| 2005/0026685 A1* | 2/2005 | Ruark et al. | 463/31 |
| 2005/0182693 A1* | 8/2005 | Alivandi | 705/27 |
| 2006/0028475 A1* | 2/2006 | Tobias | 345/473 |
| 2007/0191096 A1 | 8/2007 | Tanaka | |
| 2007/0197296 A1 | 8/2007 | Lee | |
| 2008/0045283 A1* | 2/2008 | Stamper et al. | 463/1 |
| 2008/0207323 A1 | 8/2008 | Hiroshige et al. | |
| 2008/0280684 A1* | 11/2008 | McBride et al. | 463/42 |
| 2008/0293466 A1 | 11/2008 | Arakawa et al. | |
| 2009/0029769 A1* | 1/2009 | Muller | 463/31 |
| 2009/0253475 A1* | 10/2009 | Thompson et al. | 463/7 |
| 2009/0305758 A1 | 12/2009 | Nomura | |
| 2009/0307226 A1* | 12/2009 | Koster et al. | 707/10 |
| 2009/0312080 A1* | 12/2009 | Hamilton et al. | 463/1 |
| 2009/0315893 A1* | 12/2009 | Smith et al. | 345/473 |
| 2010/0009747 A1* | 1/2010 | Reville et al. | 463/31 |
| 2010/0026698 A1* | 2/2010 | Reville et al. | 345/581 |
| 2010/0035692 A1* | 2/2010 | Reville et al. | 463/42 |
| 2010/0045697 A1* | 2/2010 | Reville et al. | 345/619 |
| 2010/0079467 A1* | 4/2010 | Boss et al. | 345/474 |
| 2010/0203968 A1* | 8/2010 | Gill et al. | 463/32 |
| 2011/0151954 A1* | 6/2011 | Bae et al. | 463/1 |

FOREIGN PATENT DOCUMENTS

| | | |
|---|---|---|
| JP | 2003-225468 | 8/2003 |
| JP | 2003-256862 | 9/2003 |
| JP | 2008-71271 | 3/2008 |
| JP | 2008-071271 | 3/2008 |
| JP | 2008-136631 | 6/2008 |
| JP | 2008-217142 | 9/2008 |
| JP | 2009-000419 | 1/2009 |

OTHER PUBLICATIONS

Office Action from Japan Patent Office (JPO) in Japanese Patent Application No. 2013-173676, dated Jan. 21, 2014, along with an English language translation thereof.

Office Action from Japan Patent Office (JPO) in Japanese Patent Application No. 2011-221564, dated Jan. 21, 2014, along with an English language translation thereof.

Dynasty Warriros 3 (Shin Sangokumuso 3), DengekiGAMES, April edition, Supplment of supplmentary volume, Master's Special of GAME S: 14 gems, MediaWorks Inc., Apr. 1, 2003, pp. 62-69.

Medal of honor: Airborne, Famitsu Xbox 360, February edition, Special supplement 1, Xbox 360 Compendium of conquering latest games, Enterbrain, Inc., Feb. 1, 2008, pp. 066-073.

* cited by examiner

ATTRIBUTE TABLE

| | CONCEPT OF CLOTHES | AGE | SEASON | NATION | |
|---|---|---|---|---|---|
| GAME A | ○ | — | — | — | .... |
| GAME B | — | — | ○ | — | .... |
| GAME C | — | ○ | — | ○ | .... |
| | ⋮ | ⋮ | ⋮ | ⋮ | |

DESIGN TABLE

| ATTRIBUTE | DISPLAY DESIGN |
|---|---|
| CASUAL |  301 |
| SEXY |  302 |
| CELEBRITY |  303 |
| ⋮ | ⋮ |

AVATAR USEABLE IN MULTIPLE GAMES THAT CHANGES APPEARANCE ACCORDING TO THE GAME BEING PLAYED

CROSS REFERENCE TO RELATED APPLICATION

The present disclosure relates to subject matter contained in Japanese Patent Application No. 2009-025290 field on Feb. 5, 2009, the disclosure of which is expressly incorporated herein by reference in its entirety.

BACKGROUND OF THE INVENTION

1. Field of the Invention

The present invention relates to a game apparatus that can play a plurality of games using a specific player character operated by a player.

2. Description of the Related Art

Conventionally, an on-line game where a player can have access to a dedicated server through a computer network and share the same game progress with the other players has been performed. At the on-line game, each player operates a character. As the character, a player character, that is, a so-called avatar is used. Also, a service that allows each player to select individual parts of a face or a hairstyle, and worn clothes or decorations so as to generate an original avatar has been provided.

For example, in order to provide a further interesting avatar by causing a user to selectively combine game items with the avatar, a character generating method combined a game item function is disclosed (for example, see Japanese Patent Application National Publication No. 2008-510563). Specifically, the character generating method includes a step of providing the avatar to the player, a step of causing a gamvatar controller to confirm whether the player requires to combine the game item function and the avatar before progressing a game, when the player acquires the game item function, a step of combining the game item function to a corresponding layer of the avatar, under the control of the gamvatar controller, when the player desires to combine the game item function and the avatar, and a step of causing a gamvatar provider to generate a combined gamvatar.

Meanwhile, a design of the avatar is displayed according to a design of clothes or decorations purchased by the user. However, according to kinds of games that the avatar participates, clothes of the avatar may not be matched. For example, clothes that may be matched to the avatar in a sports game and a Japanese chess game are completely different from each other. In this case, items that the avatar wears need to be changed according to a game that the avatar participates.

SUMMARY OF THE INVENTION

An object of the present invention is to provide a game apparatus that can display an avatar matched to any kind of games that the avatar participates, without changing clothes or decorations worn by the avatar to new clothes or decorations.

According to a first aspect of the present invention, there is provided a game apparatus that can play a plurality of games using a specific player character (avatar) operated by a player, the game apparatus includes an item display data specifier that specifies display data of items possessed or worn by the player character based on attributes set to the items and a design table where a correspondence relationship between the attributes and the display data of the items is set, the design table being different or same for every game; a character display data generator that generates display data of the player character based on the specified display data of the items; and a character displayer that displays the player character on a display screen based on the generated display data of the player character.

The design of the displayed items is determined according to the attributes of the items (clothes or decorations) possessed or worn by the avatar. For this reason, if the display data different for every game is set to the design table, the design different for every game can be displayed even in the same item. Even when the player plays a game of a new genre that is not played by the player until now, an avatar that has a design matched to the game can be displayed by only causing the avatar to wear the items possessed by the player. Further, even when a service of a new game starts to be provided, an avatar that has a design matched to the game can be displayed by only causing the avatar to wear the items possessed by the player.

Preferably, according to the first aspect of the present invention, the game apparatus further includes an item displayer that displays the items on the display screen based on the specified display data of the items; and an item selector that selects items to be possessed or worn by the player character in accordance with an input from the player. Preferably, the character display data generator generates the display data of the player character based on the selected display data of the items.

When the player logs in the game, the player can grasp display aspects of all of the items that exist in "my closet" to manage the items possessed by the player, and can select the items to be possessed or worn by the avatar. Therefore, a game apparatus where usability is excellent can be provided.

Preferably, according to the first aspect of the present invention, the design table stores the display data of the items when the items possessed or worn by the player character is a specific combination, and when the items possessed or worn by the player character is the specific combination, the item display data specifier specifies the display data of the items based on the display data of the items when the items is the specific combination.

When the items that are possessed or worn by the avatar are a specific combination, a design according to the specific combination is displayed, regardless of the attributes of the items. Therefore, the player can be urged to collect the specific items, and player's enjoyment can be increased.

According to a second aspect of the present invention, there is provided a game character displaying method that is executed in a game apparatus, which can play a plurality of games using a specific player character operated by a player, the method includes specifying display data of items possessed or worn by the player character based on attributes set to the items and a design table where a correspondence relationship between the attributes and the display data of the items is set, the design table being different or same for every game; generating display data of the player character based on the specified display data of the items; and displaying the player character on a display screen based on the generated display data of the player character.

According to a third aspect of the present invention, there is provided a tangible computer-readable recording medium in which a game program executed by a game apparatus is recorded, the game apparatus capable of playing a plurality of games using a specific player character operated by a player, the game program includes an item display data specifying code segment that, when executed, specifies display data of items possessed or worn by the player character based on attributes set to the items and a design table where a correspondence relationship between the attributes and the display data of the items is set, the design table being different or same for every game; a character display data generating code segment that, when executed, generates display data of the player character based on the specified display data of the items; and a character displaying code segment that, when executed, displays the player character on a display screen based on the generated display data of the player character.

BRIEF DESCRIPTION OF THE DRAWINGS

FIGS. 5(a) and 5(b) are diagrams illustrating a change in display contents of a display screen 114 in "my closet";

DETAILED DESCRIPTION OF THE EMBODIMENTS

Figure 1:
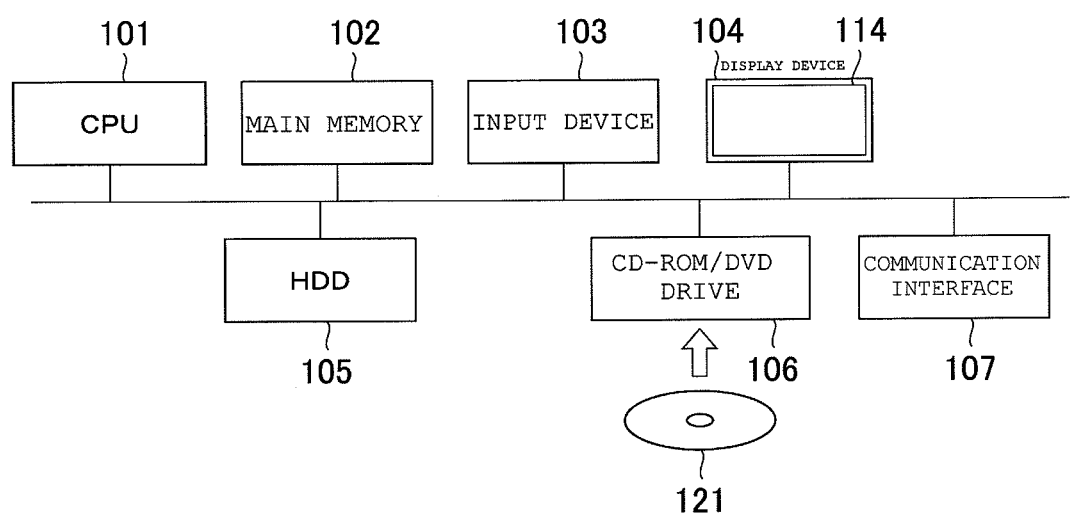
FIG. 1 is a block diagram illustrating a configuration of a game apparatus according to an embodiment of the present invention.

Hereinafter, an embodiment of the present invention will be described with reference to the accompanying drawings. FIG. 1 is a block diagram illustrating the configuration of a game apparatus according to the embodiment. As illustrated in FIG. 1, the game apparatus includes a central processing unit (CPU) 101, a main memory 102, an input device 103, a display device 104, a hard disk drive (HDD) 105, a CD-ROM/DVD drive 106, and a communication interface 107. The display device 104 includes a display screen 114, and a recording medium 121 can be loaded with the CD-ROM/DVD drive 106. The communication interface 107 is connected to a communication network thorough wired communication or wireless communication.

The CPU 101 executes a program that is stored in the HDD 105 or the recording medium 121, and controls an apparatus body. The main memory 102 is a work area of the CPU 101. The HDD 105 is used as a storage region to store a program or data.

The CD-ROM/DVD drive 106 reads a program and data from the recording medium 121. The input device 103 includes a mouse that is used as a pointing device and a keyboard that has directional keys. The keyboard is used to operate a player character (avatar) and input texts at the time of chatting. In addition, input data from the input device 103 is output to the main memory 102, and the CPU 101 analyzes the input data and executes calculation processing. The program and data executed by the game apparatus may be stored in the recording medium 121.

The CPU 101 develops image data and displays an image on the display screen 114 of the display device 104. During the image processing, the control device (including the CPU and the ROM) for the image processing may be used.

Figure 2:
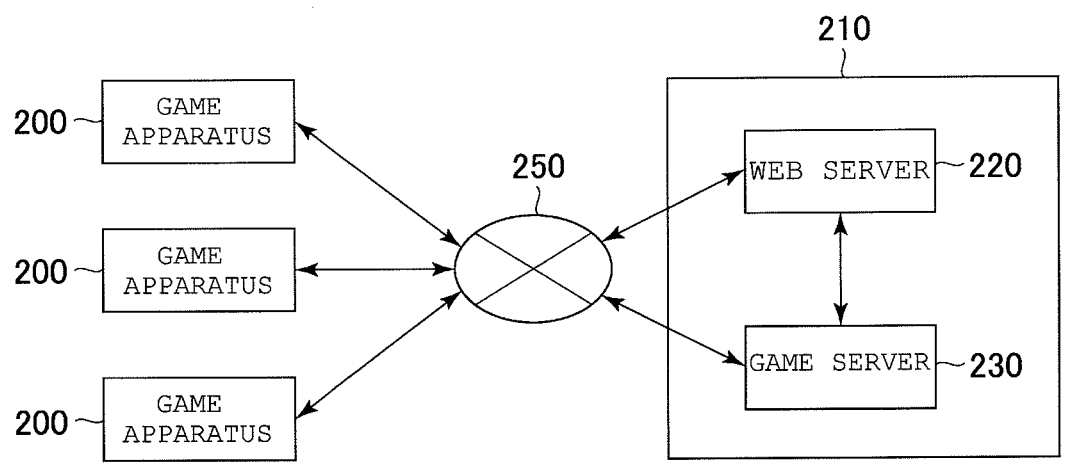
FIG. 2 is a diagram illustrating an outline of a game system that is needed when a game apparatus according to the present invention uses an avatar to play a game.

FIG. 2 is a diagram illustrating the outline of a game system that is needed when a game apparatus according to the present invention uses an avatar to play a game. A game apparatus 200 according to the present invention can use the communication interface 107 to be connected to a website 210 through a communication network 250. A web server 220 is a server that provides services, such various games and shopping of items. The player has access to the web server 220 and acquires an avatar. If the player selects a game that the player desires to play from the web server 220, the player can have access to a game server 230, and a game is progressed. Since the plurality of game apparatuses 200 can be simultaneously connected to the game server 230, a game can be played between a plurality of players who operate the game apparatuses 200. The player can play a plurality of games according to his or her taste. For example, the player can play a puzzle game, an action game, a simulation game, a fighting game, a sports game, a racing game, a shooting game, a role-playing game, a Japanese chess game, a Go game, a mah-jongg game, without depending on genres of games.

The player has access to the web server 220 and acquires items with charges or without charges, and causes the avatar to possess or wear the acquired items to be used in the game. The player can purchase the items using virtual money used in the game. The player can acquire the items by clearing a predetermined condition in the game (such as gaining a victory against a predetermined enemy character or clearing a predetermined mission). Even though the items are the items that are purchased using the virtual money in an arbitrary game or the items acquired by clearing the predetermined condition, the corresponding items can be used in another game. These items may be set to show a special effect at the time of progressing a game, such that the game can be progressed under an advantageous condition, in addition to having different designs.

The avatar is configured mainly with a face, body parts, a hair, tops, bottoms, decorations, and a background. In general, the player purchases items, such as the hair, the tops, the bottoms, the decorations, and the background, from an item shop in the website 210, and causes the avatar to wear the purchased items by the selection of the player.

Figure 3:
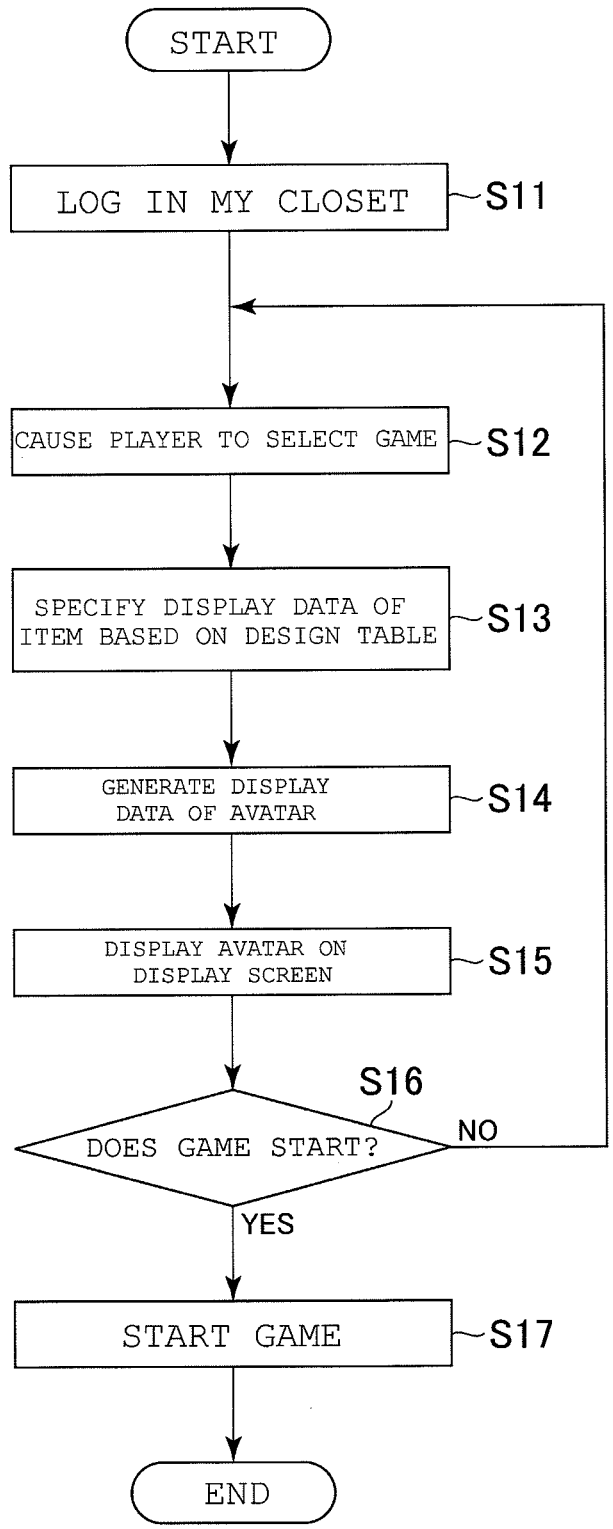
FIG. 3 is a flowchart illustrating a process flow of when display processing of an avatar on a display screen is executed.

FIG. 3 is a flowchart illustrating a process flow of when display processing of an avatar on a display screen is executed. First, the game apparatus 200 has access to the web server 220 and an ID number and a password that are set for each player are input by an operation of the player, and a login is performed with respect to the "my closet" to manage the items (step S11). A management screen to manage the items is displayed on the display screen 114. The "my closet" is allocated to each player, and the player can select the items to be worn by the avatar from the "my closet". The player can select a desired game among the plurality of games provided through the game server 230 in the "my closet".

If the login is performed with respect to the "my closet", character data of the avatar that is operated by the player is read from a character database (not illustrated) connected to the web server 220 based on the ID number of the player. The character data includes item data of the items that are possessed or worn by the avatar, and the item data includes an attribute set for each item. In addition, the item data may include information of a special effect (for example, improvement of an attack capability or a defensive capability in a role-playing game) that is generated when the avatar possesses and wears (is equipped with) each item.

After logging in the "my closet", if the player operates the input device 103 and moves a cursor to a start button of the game displayed on the display screen 114 (step S12), display data of the items is specified based on a design table (step S13). In step S13, if the display data of the item is specified, display data of the avatar is generated based on the specified display data of the items (step S14).

The avatar is configured by a plurality of layers that are related to item images, and the avatar can be displayed by overlapping the layers of the individual item images. The item image that is related to the background becomes the lowest layer. On the item image that is related to the background, the item image that is related to the face (parts of the face or a hairstyle) or the body part of the avatar overlaps. On the item image that is related to the face or the body part, the item image that is related to underwear or outerwear overlaps. On the highest layer, the item image that is related to decorations, such as accessories, overlaps.

The avatar is displayed on the display screen 114 of the display device 104 based on the generated display data of the avatar (step S15). Next, if the player operates the input device 103 and an input of a game start (click of a game selection button) is given (step S16; YES), the game apparatus 200 has access to the game server 230, and a game starts (step S17). The display screen 114 changes from the "my closet" to the game screen. If the display screen changes to the game screen, the avatar that is displayed in step S15 is displayed on the game screen, and the game progresses. The player may appropriately stop the game even during the progress of the game, return the display screen to the "my closet", and change the items that the avatar wear. Meanwhile, when the game does not start (step S16, NO), the display design of the avatar does not change as long as the cursor on the display screen 114 is disposed on the game selection button. However, if the cursor moves to another game selection button, the processings of steps S12 to S15 are executed, and the display design of the avatar changes. Theses processings are repetitively executed until the game starts in step S17. Accordingly, if the player moves the cursor to the game selection button of each game, the player can confirm a display aspect of the avatar in the game before starting the game. Similar to the web server 220, a design table is set to the game server 230. When the game starts in step S17, the similar processings as the processings of steps S13 and S14 are executed by the game server 230, and the avatar is displayed on the display screen 114.

FIGS. 5(a) and 5(b) are diagrams illustrating a change in display contents of a display screen 114 in "my closet". FIG. 5(a) illustrates an example of the display screen 114 before moving the cursor to the game selection button in step S12, after logging in the "my closet". In the display screen 114 of FIG. 5(a), an avatar display region 501 to display an avatar 401 possessed by the player and a game selection region 502 are provided. Below the avatar display region 501, a user name that is a name of the player in the game is displayed. In the game selection region 502, a plurality of game selection buttons 503a to 503f are provided. In this case, a cursor 504 does not indicate a specific game selection button 503, and the avatar 401 is displayed according to a display design which is a reference adopted in most of games. If the cursor 504 is moved to the game selection button 503, the display design of the avatar 401 changes. FIG. 5(b) illustrates an example of the display screen 114 when the cursor moves to the game selection button in step S12. The cursor 504 is moved to the game selection button 503d of a Go game. The avatar 401 of FIG. 5(a) wears Western clothes and an avatar 402 that is displayed on the avatar display region 501 wears Japanese clothes. If the game selection button 503d is pressed, the Go game starts.

Figure 4:
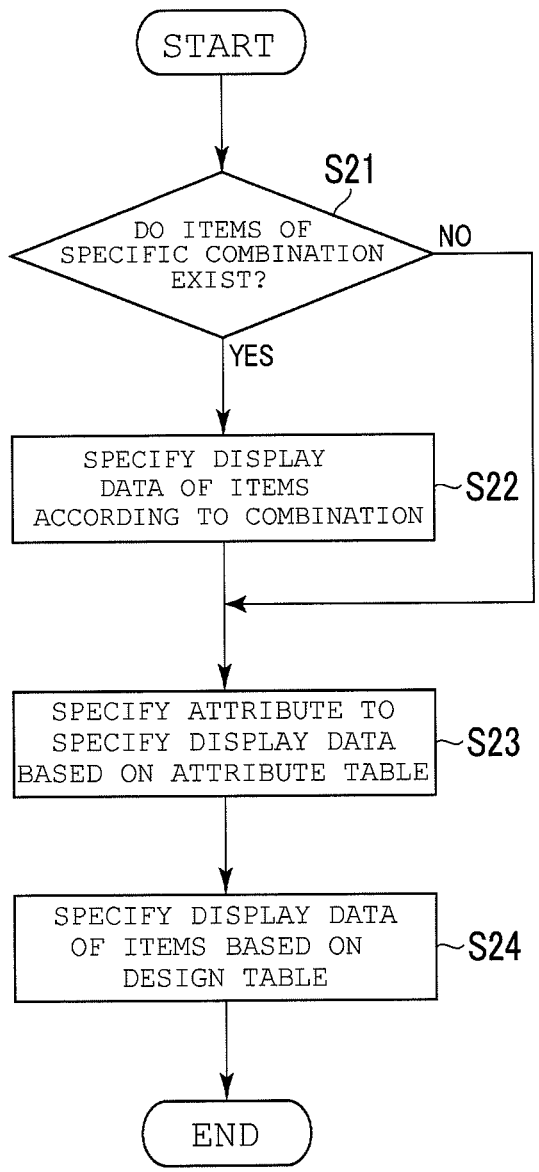
FIG. 4 is a flowchart illustrating a process flow of when specifying processing of display data of items is executed.

FIG. 4 is a flowchart illustrating a process flow of when the specifying processing of the display data of the items in step S13 is executed. First, among the items that the avatar possesses or wears, it is determined whether items of a specific combination exist (step S21). When the items of the specific combination exist (step S21; YES), with respect to the items that are related to the specific combination, display data corresponding to the specific combination that is predetermined in the design table is specified, regardless of the attributes thereof (step S22). Since the design according to the combination is displayed regardless of the attributes of the items, the player can be urged to collect the specific items, and player's enjoyment can be increased. For example, in the case where items of a "shiny dress" and a "shiny helmet" are the specific combination, it can be set that, when these items are equipped together, the "shiny dress" and the "shiny helmet" are displayed brighter than when these items are not equipped together.

The display data of the items that are related to the specific combination set in the design table may be different for each game. An item group that becomes a specific combination may be changed for each game, such that the items become items related to the specific combination at a game, but do not become the items related to the specific combination at another game. For example, when the avatar wears an item A and an item C, an avatar of a human shape may be displayed at another game, but "slime" may be displayed in the case of an RPG game. In this way, the players can be urged to competitively find out a matching relationship between a game and an item combination for special display of the avatar, and player's enjoyment can be increased.

Figures 5, 6:
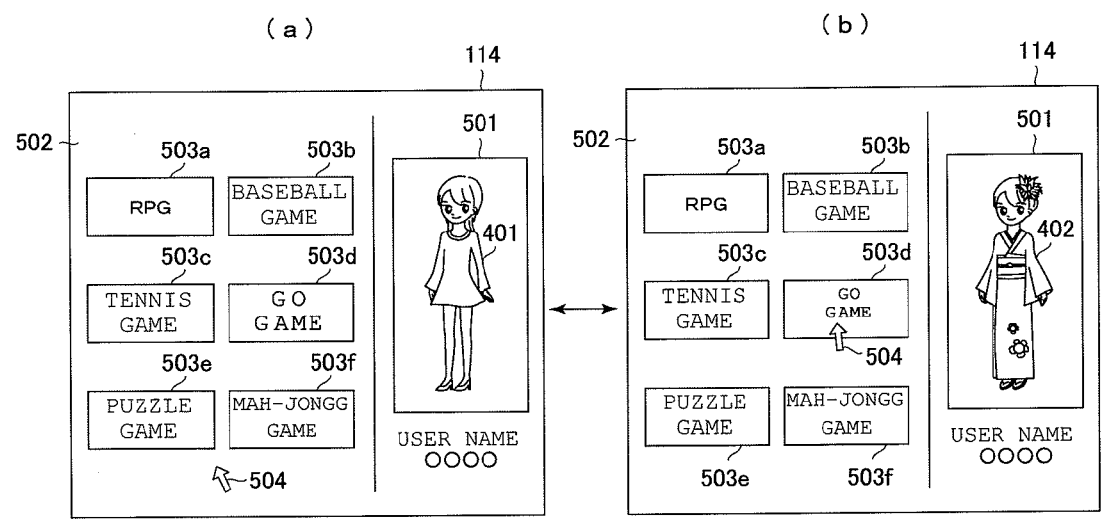
FIG. 6 is a diagram illustrating an example of an attribute table.

When the items of the specific combination do not exist (step S21; NO), an attribute to specify the display data of the items is specified based on the attribute table (step S23). In step S22, even when the display data corresponding to the specific combination is specified, with respect to items that do not correspond to another specific combination, an attribute to specify the display data of the items is specified based on the attribute table (step S23). If the items are caused to have a plurality of attributes and the attribute used to specify the display data of the items for each game are set to the attribute table, the attribute to specify the display data of the items can be changed for each game, and avatars corresponding to various kinds of games can be displayed. FIG. 6 is a diagram illustrating an example of the attribute table. In each item, an attribute that is related to a concept of clothes, an attribute that is related to a style depending on an age, an attribute that is related to a season, and an attribute that is related to a style of clothes for every nation are set. In a game A, display data is specified based on the attribute related to the concept of the clothes. In a game B, display data is specified based on the attribute related to the season. In a game C, display data is specified based on the attribute related to the style depending on the age and the attribute related to the style of the clothes for every nation. For example, in regards to a certain item, when a "casual" is set as the attribute related to the concept of the clothes, a "modern age" is set as the attribute related to the style depending on the age, a "spring" is set as the attribute related to the season, and "Western clothes" is set as the attribute related to the style of the clothes for every nation, in the game A, display data of the item is specified based on the attribute of the "casual". In the game B, display data of the item is specified based on the attribute of the "spring". In the game C, display data of the item is specified based on the attributes of the "modern age" and the "Western clothes".

In step S23, if the attribute to specify the display data is specified, the display data corresponding to the attribute is specified based on the design table (step S24). Based on the display data of the item specified in step S24, the display data of the avatar is generated in step S14 described above. Similar to the web server 220, a design table and an attribute table are set to the game server 230. When the game starts in step S17, the similar processings as the processings of steps S21 to S24 are executed by the game server 230, and the display data of the items is specified.

In the present invention, a different design table is set for each game, and the design of the displayed avatar also changes depending on the login game (or game selection button to which the cursor is moved). For example, even when the attribute of the item is "casual", in the case of the sports game, the display design of the item also becomes sporty and casual. In the case of the Go game or the Japanese chess game, the display design becomes relatively casual while being the Japanese clothes.

Figure 7:
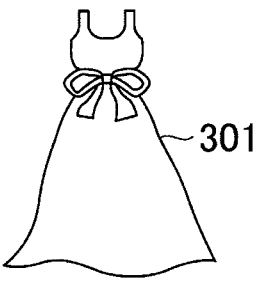
FIG. 7 is a diagram illustrating an example of a design table.
Figure 7:
Figure 7:
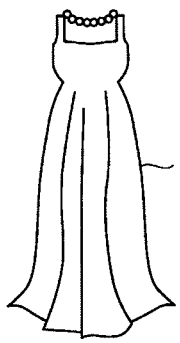

FIG. 7 is a diagram illustrating an example of a design table in a game. As illustrated in FIG. 7, in the case of an item of a one-piece type, a display design is determined according to an attribute. For example, in the case of an item having an attribute of "casual", the item is displayed as casual clothes like a display design 301, and in the case of an item having an attribute of "sexy", the item is displayed as sexy clothes like a display design 302. In the case of an item having an attribute of a "celebrity", the item is displayed as luxury clothes like a display design 303. In this case, as the attributes that are set to the items, the attributes, such as "casual", "sexy", and "celebrity", which are related to the concept of the clothes, are used, but the present invention is not limited thereto. For example, textures of materials such as "hard" and "soft", colors such as "blue" and "red", styles depending on ages such as an "old age", a "modern age", and a "present age", seasons such as a "spring", a "summer", an "autumn", and a "winter", and styles of the clothes for every nation such as "Japanese clothes", "Western clothes", and "Chinese clothes", may be set as attributes. Alternatively, attributes, such as "0 to 100 G (gold which is a unit of virtual money)", "101 to 300 G", and "301 to 500 G", which are related to purchases of the items, may be set. The attributes of the items are not limited to the above examples, and may be appropriately set. The design table may be differently set according to a sex of each avatar. The display data that is stored in the design table can be appropriately updated.

Figure 8:
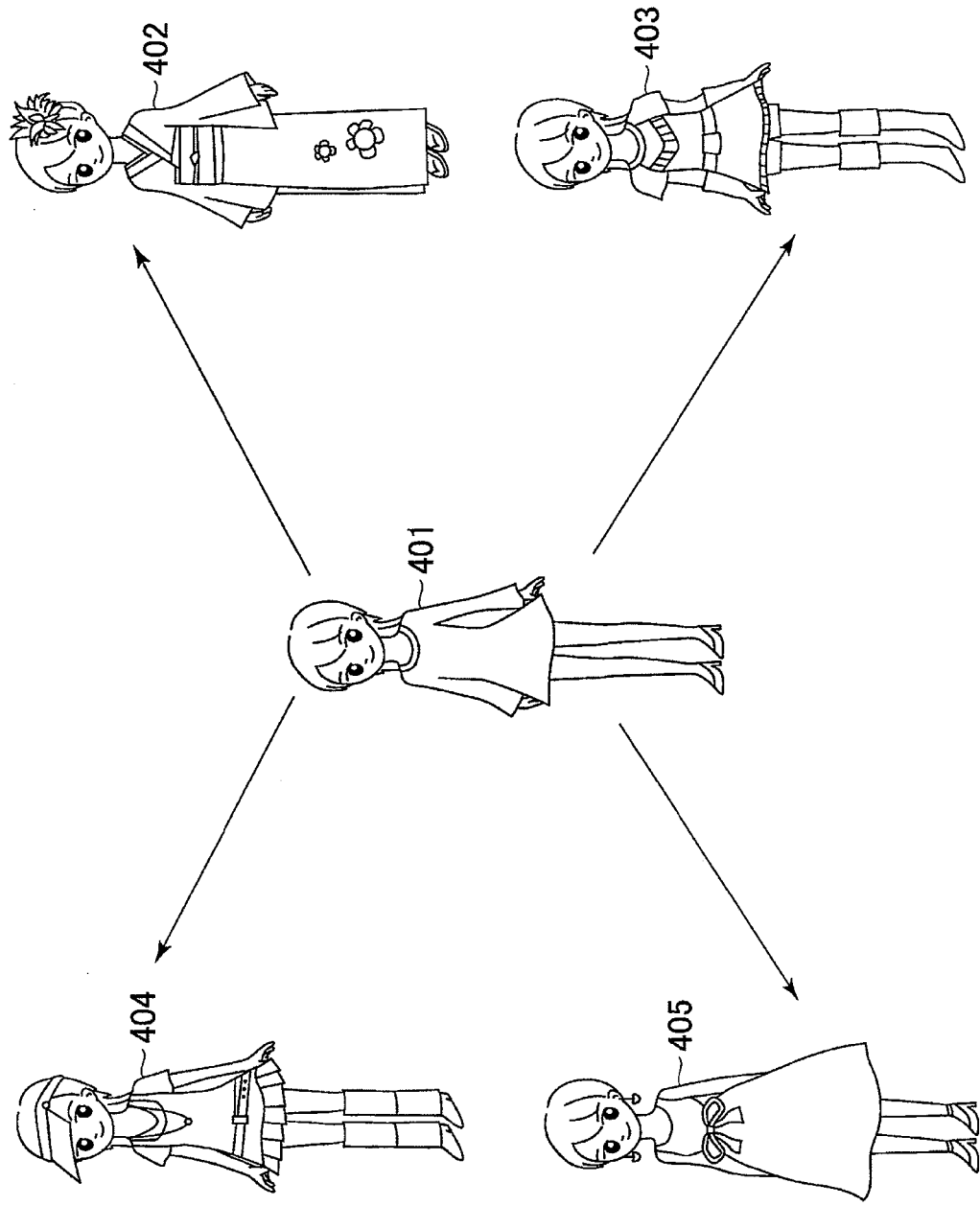
FIG. 8 is a diagram illustrating a change in a display design of an avatar for each game.

FIG. 8 is a diagram illustrating a change in a display design of an avatar for each game. For example, an avatar 401 corresponds to a display design which is a reference adopted in most of games. The display design set in the design table of the Go game or the Japanese chess game is Japanese clothes. If the player having the avatar 401 logs in the Go game or the Japanese chess game, the avatar that wears the Japanese clothes is displayed like an avatar 402. Meanwhile, if the player logs in the RPG, the avatar that wears fighting clothes is displayed like an avatar 403. If the player logs in the sports game, the avatar that wears the sports clothes is displayed like an avatar 404. If the player logs in a card game, the avatar that wears a dress is displayed like an avatar 405. Even in the same genre of games such as RPG or sports game, a different design table can be used for each game, and a design where a world view in each game is expressed can be used. Accordingly, even when the player plays a game of a new genre that is not played by the player until now, an avatar that has a design matched to the game can be displayed by only causing the avatar to wear the items possessed by the player.

In the above-described embodiment, the display data of each item is specified by setting the attribute, such as "casual", "sexy", and "celebrity", to each item and using the different design table for each game. However, the display data can be specified by executing calculation based on the attributes of the items. For example, a point 1 is predetermined when the attribute is "casual", a point 2 is predetermined when the attribute is "sexy", and a point 3 is predetermined when the attribute is "celebrity". In the game C (sports game), an "equation (C): point×1" is used as a calculation equation, and in the game D (Japanese chess game), "equation (D): point×1+10" is used as a calculation equation. When the display data of the item is "casual", the calculation result becomes "1" (=1×1) in the game C, and the calculation result becomes "11" (=1×1+10) in the game D. In the design table, when the calculation results are 1 to 3, the sporty display design is prepared. When the calculation results are 11 to 13, the display design of the Japanese clothes is prepared. In this case, the avatar that wears the sporty clothes can be displayed in the game C, and the avatar that wears the Japanese clothes can be displayed in the game D. As such, even though the design table is not changed for every game, the display design of the items can be changed by changing a calculation equation for every game. Accordingly, even when a service of a new game starts to be provided at the web site, the design table that is common to the other games can be used, and a development burden of the game can be alleviated.

In addition to the configuration of the above-described embodiment, the design of the avatar can be changed according to a history of games. The history of games indicates which game the player plays, how long and how many times the player plays the game, in which game the player satisfies the predetermined condition (whether to clear the predetermined mission, gain a victory against the predetermined enemy character, or reach the predetermined level during the game), or contents of chatting during the on-line game. Since the design of the avatar is changed based on the game history of the player, the player can possess the unique avatar, and can sufficiently show originality.

For example, when the design of the items that are possessed by the avatar is changed according to a play time or a play frequency of each game, display data of each item according to the play time or the play frequency of each game is set to the design table, for each item, and the design of the displayed avatar changes, whenever the play time or the play frequency of the player increases. The design is prepared with the several steps for every item. For example, if the utilization time or the utilization frequency of the RPG increases, the design of the items of the avatar becomes similar to the design for fighting used in the RPG. If the utilization time or the utilization frequency of the Go game or the Japanese chess game increases, the design that is similar to the Japanese clothes can be used. If the play time or the play frequency of both the RPG and the Go game increases, a design where the features of the design for the fighting and the design of the Japanese clothes are combined may be used.

When the design of the item is changed according to whether to clear the predetermined mission, to gain the victory against the predetermined enemy character, or to reach the predetermined level during the game, display data of each item according to the number of cleared missions or difficulty levels thereof, the number of enemy characters that the player gained the victory or levels thereof, or a reached level of the character is set to the design table, for each item. If the player clears the mission or gains the victory against the enemy character or the level of the character becomes high, the design of the displayed avatar is also changed. For example, when a large number of missions are cleared in the RPG, the design of the item can further become similar to the design for the fighting used in the RPG.

The design of the items that are possessed by the player can be changed according to the contents of chatting during the on-line game. In the on-line game, text sentences that are input by the player may be displayed, and the players may have a chat with each other. The display data of the item according to a utilization frequency of a specific keyword during chatting may be set to the design table, and the design may be changed whenever the utilization frequency of the keyword exceeds the predetermined utilization frequency.

In addition to the configuration of the above-described embodiment, the item may be configured to have a translating function for translating (converting) sentences input from the player through chatting. Each item may have an attribute on a "speaking way" in which the sentences are converted, and a method for translating words may be predetermined according to the attribute. Examples of the attribute may include "casual", "celebrity", "sexy", and "cutie". The "speaking way" in which the sentences are converted is determined according to the attributes of the items that avatar wears. For example, when the attribute of "cutie" is high, if "hi" is input, "welcome back, master" is displayed. Since the item possessed by the avatar has a translating function to enable a speaking way matched to the clothes, a conversion by chatting becomes more realistic, and player's enjoyment can be increased. The translating function of the item described herein may be a function of translating the Japanese language into the different language, such as the English language or the Chinese language, as well as converting the Japanese language into the Japanese language of a different expression.

What is claimed is:

1. A game apparatus capable of playing a plurality of games using a player character operated by a player, the game apparatus comprising:
   a character acquirer that acquires the player character, the player character being usable by the player in each of the plurality of games and one of possessing and wearing each of a plurality of items in each of the plurality of games;
   a design table storage that stores a design table for the player character, the design table including display data of the plurality of items and attributes set for each of the plurality of items in each of the plurality of games, the attributes defining different designs of the plurality of items for differently displaying the plurality of items in the plurality of games;
   an item display data specifier that specifies the display data of the plurality of items one of possessed and worn by the player character in the plurality of games based on the attributes set for each of the plurality of items;
   a game selector that selects one of the plurality of games; and
   a processor that:
      generates the player character based on the display data of the plurality of items specified by the display data specifier; and
      displays the player character on a display screen based on the player character generated by the processor,
   wherein the processor displays the player character and each of the plurality of games on a game selecting screen, and updates an appearance of the player character on the game selecting screen in accordance with a selection of one of the plurality of games by the game selector.

2. The game apparatus according to claim 1, further comprising:
   an item displayer that displays the plurality of items on the display screen based on the display data of the plurality of items specified by the item display data specifier; and
   an item selector that selects items from among the plurality of items to be one of possessed and worn by the player character in accordance with an input from the player,
   wherein the processor generates the player character based on the display data of the selected items.

3. The game apparatus according to claim 1,
   wherein the design table indicates when the attributes set for the plurality of items one of possessed and worn by the player character in the plurality of games is a specific combination, and
   when the attributes set for the plurality of items one of possessed and worn by the player character in the plurality of games is the specific combination, the item display data specifier specifies the display data of the plurality of items based on the specific combination.

4. The game apparatus according to claim 3, wherein the specific combination is different for each of the plurality of games.

5. The game apparatus according to claim 1, wherein the attributes are set for each of the plurality of items in each of the plurality of games based on one of a play time and a play frequency of each of the plurality of games.

6. The game apparatus according to claim 5, wherein a uniqueness of the player character in each of the plurality of games increases in accordance with the one of the play time and the play frequency of each of the plurality of games.

7. A game character displaying method that is executed in a game apparatus, the game apparatus capable of playing a plurality of games using a player character operated by a player, the method comprising:
   acquiring, via an interface, the player character, the player character being usable by the player in each of the plurality of games and one of possessing and wearing each of a plurality of items in each of the plurality of games;
   storing, in a memory, a design table for the player character, the design table including display data of the plurality of items and attributes set for each of the plurality of items in each of the plurality of games, the attributes defining different designs of the plurality of items for differently displaying the plurality of items in the plurality of games;
   specifying, by a processor, the display data of the plurality of items one of possessed and worn by the player character in the plurality of games based on the attributes set for each of the plurality of items;
   generating, by the processor, the player character based on the display data of the plurality of items specified by the processor;
   displaying, by the processor, the player character on a display screen based on the player character generated by the processor;
   displaying, by the processor, the player character and each of the plurality of games on a game selecting screen;
   selecting, by the processor, one of the plurality of games in accordance with an operation of the player; and
   updating, by the processor, an appearance of the player character on the game selecting screen in accordance with the one of the plurality of games selected in accordance with the operation of the player.

8. The game character displaying method according to claim 7,
   wherein the design table indicates when the attributes set for the plurality of items one of possessed and worn by the player character in the plurality of games is a specific combination, and
   when the attributes set for the plurality of items one of possessed and worn by the player character in the plurality of games is the specific combination, the display data of the plurality of items is specified by the processor based on the specific combination.

9. The game character displaying method according to claim 8, wherein the specific combination is different for each of the plurality of games.

10. The game character displaying method according to claim 7, wherein the attributes are set for each of the plurality of items in each of the plurality of games based on one of a play time and a play frequency of each of the plurality of games.

11. The game character displaying method according to claim 10, wherein a uniqueness of the player character in each of the plurality of games increases in accordance with the one of the play time and the play frequency of each of the plurality of games.

12. A non-transitory computer-readable recording medium in which a game program executed by a game apparatus is recorded, the game apparatus capable of playing a plurality of games using a player character operated by a player, the game program comprising:
- a character acquiring code segment that, when executed, acquires the player character, the player character being usable by the player in each of the plurality of games and one of possessing and wearing each of a plurality of items in each of the plurality of games;
- a design table storage code segment that, when executed, stores a design table for the player character, the design table including display data of the plurality of items and attributes set for each of the plurality of items in each of the plurality of games, the attributes defining different designs of the plurality of items for differently displaying the plurality of items in the plurality of games;
- an item display data specifying code segment that, when executed, specifies the display data of the plurality of items one of possessed and worn by the player character in the plurality of games based on the attributes set for each of the plurality of items;
- a character display data generating code segment that, when executed, generates the player character based on the display data of the plurality of items specified by the item display data specifying code segment;
- a character displaying code segment that, when executed, displays the player character on a display screen based on the player character generated by the character display data generating code segment;
- a selecting screen displaying code segment that, when executed, displays the player character and each of the plurality of games on a game selecting screen;
- a game selecting code segment that, when executed, selects one of the plurality of games in accordance with an operation of the player; and
- a player character updating code segment that, when executed, updates an appearance of the player character on the game selecting screen in accordance with the one of the plurality of games selected by the game selecting code segment in accordance with the operation of the player.

13. The non-transitory computer-readable recording medium according to claim 12,
wherein the design table indicates when the attributes set for the plurality of items one of possessed and worn by the player character in the plurality of games is a specific combination, and
when the attributes set for the plurality of items one of possessed and worn by the player character in the plurality of games is the specific combination, the display data of the plurality of items is specified by the item display data specifying code segment based on the specific combination.

14. The non-transitory computer-readable recording medium according to claim 13, wherein the specific combination is different for each of the plurality of games.

15. The non-transitory computer-readable recording medium according to claim 12, wherein the attributes are set for each of the plurality of items in each of the plurality of games based on one of a play time and a play frequency of each of the plurality of games.

16. The non-transitory computer-readable recording medium according to claim 15, wherein a uniqueness of the player character in each of the plurality of games increases in accordance with the one of the play time and the play frequency of each of the plurality of games.

* * * * *